United States Patent [19]

Beguinot et al.

[11] Patent Number: 5,855,846
[45] Date of Patent: Jan. 5, 1999

[54] STEEL REPAIRABLE BY WELDING FOR THE MANUFACTURE OF MOLDS FOR PLASTICS

[75] Inventors: Jean Beguinot, Le Creusot; Gilbert Primon, Saint Vallier; Frédéric Chenou, Le Creusot, all of France

[73] Assignee: Creusot Loire Industrie, Puteaux, France

[21] Appl. No.: 848,651

[22] Filed: Apr. 29, 1997

[30] Foreign Application Priority Data

Apr. 29, 1996 [FR] France .................................. 96 05335

[51] Int. Cl.$^6$ ...................................................... C22C 38/00
[52] U.S. Cl. ............................................. 420/121; 420/106
[58] Field of Search ...................................... 420/121, 104, 420/105, 106, 108, 109, 110, 111, 112, 113, 114

[56] References Cited

FOREIGN PATENT DOCUMENTS

A-1 020 913  10/1962  United Kingdom .
A-2 186 594   1/1987  United Kingdom .

OTHER PUBLICATIONS

Patent Abstracts of Japan vol. 18, No. 107 (C–1169), Feb. 22, 1994, and JP–A–05 302117 (Aichi Steel Works Ltd.), Nov. 16, 1993.

Patent Abstract of Japan vol. 15, No. 324 (C–859), and JP–A–03 122252 (Hitachi Metals Ltd.), May 24, 1991.

*Primary Examiner*—John Sheehan
*Attorney, Agent, or Firm*—Oblon, Spivak, McClelland, Maier & Neustadt, P.C.

[57] ABSTRACT

Steel for the manufacture of molds, and especially of molds for injection molding of plastics, whose chemical composition comprises, by weight: $0.17\% \leq C \leq 0.27\%$, $0\% \leq Si \leq 0.5\%$, $0\% \leq Mn \leq 2\%$, $0\% \leq Ni \leq 2\%$, $0\% \leq Cr \leq 3\%$, $0\% \leq Mo+W/2 \leq 1.5\%$, $0\% \leq V+Nb/2+Ta/4 \leq 0.5\%$, $0.002\% \leq B \leq 0.015\%$, $0.005\% \leq Al \leq 0.2\%$, optionally at least one element taken from sulfur, selenium and tellurium, the sum of the contents of these elements being smaller than or equal to 0.2% optionally at least one element taken from titanium and zirconium, in contents such that the sum of the titanium content and of half the zirconium content is smaller than or equal to 0.3%, optionally at least one element taken from lead and bismuth, the sum of the contents of these elements being smaller than or equal to 0.2%, optionally calcium in a content lower than or equal to 0.1%, the remainder being iron and impurities resulting from the production, the chemical composition additionally satisfying the following relationships: $Cr+3\times(Mo+W/2)+10\times(V+Nb/2+Ta/4) \geq 2.1$, $Mo+W/2 > 0.7\%$ if $Cr \leq 1.5\%$, $Qu=3.8 \times C+1.1 \times Mn+0.7 \times Ni+0.6 \times Cr+1.6 \times (Mo+W/2)+0.6 \geq 3$, $R=3.8 \times C+10 \times Si+3.3 \times Mn+2.4 \times Ni+1.4 \times (Cr+Mo+W/2) \leq 11$.

14 Claims, No Drawings

STEEL REPAIRABLE BY WELDING FOR THE MANUFACTURE OF MOLDS FOR PLASTICS

FIELD OF THE INVENTION

The present invention relates to a low-alloy steel employed especially for the manufacture of molds for plastics or for rubber, and which exhibits a good aptitude for repair by welding.

Molds for plastics or for rubber are manufactured by machining massive blocks of metal whose thickness can exceed 1500 mm. The aim of the machining is, in particular, to form a cavity which has the shape of the object to be obtained by molding. In most cases the surface of the cavity is either polished or chemically grained in order to impart the desired surface appearance to the objects obtained by molding. Since the molding operation is performed by injecting hot plastic under pressure, the mold must withstand the forces due to the pressure of the plastic, without being distorted, and must remove the heat from the plastic while resisting the wear due to the friction of the plastic on the surface of the cavity. The steel employed for the manufacture of these molds must have characteristics which allow these requirements to be met. In addition the characteristics of the steel must remain stable while the molds are being used, that is to say must be insensitive to the thermal cycles due to the molding operations.

Besides the properties which have just been referred to, the steel for molds is required to exhibit some weldability, in order to make it possible to carry out repairs either when the mold is too worn, or to retouch the shape of the cavity. In general, when a mold for molding a new object is manufactured, a first mold is produced with which a first object is manufactured, which is examined by its designer, which designer often asks for the shape of the object, and hence of the mold cavity, to be more or less modified. To avoid having to manufacture a complete mold again, which is very costly, a refill is produced by welding on the mold cavity and then new machining is carried out, often followed by polishing and, optionally, graining. It is therefore desirable that the regions refilled by welding and the zones affected by the heat of welding (ZAH) should have properties that are very close to those of the initial metal.

To satisfy all these conditions it would be necessary to be able to have at one's disposal, for the manufacture of molds for injection molding of plastics, a steel that has, in particular and at the same time, very great hardness, very good machinability, very good polishability or chemical grainability, good thermal conductivity, a very high homogeneity of all these characteristics, even in the greatest thicknesses, and, finally, a good repairability by welding. Such an ideal steel is unknown.

To manufacture the molds, use is generally made of blocks of low-alloy steel which is sufficiently quenching to obtain, after quenching and annealing, a martensitic or bainitic structure which has a sufficient hardness, a high yield point and good toughness.

The steels most widely employed are steel P20 according to the AISI standard and steels W1.2311 or W1.2738 according to the German Werkstoff standard.

Steel P20 contains, by weight, from 0.28% to 0.4% of carbon, from 0.2% to 0.8% of silicon, from 0.6% to 1% of manganese, from 1.4% to 2% of chromium and from 0.3% to 0.55% of molybdenum, the remainder being iron and impurities related to the production.

Steel W1.2311 and W1.2738 contain, by weight, from 0.35% to 0.45% of carbon, from 0.2% to 0.4% of silicon, from 1.3% to 1.6% of manganese, from 1.8% to 2.10% of chromium and from 0.15% to 0.25% of molybdenum; steel W1.2738 additionally contains from 0.9% to 1.2% of nickel, the remainder being iron and impurities related to the production.

These steels have a good wear behavior and good mechanical characteristics, but they have the disadvantage of not being very weldable, which makes repairs by welding difficult.

Prior art

In order to overcome this disadvantage, a steel for the manufacture of molds for injection molding of plastics has been proposed, especially in European patent application EP 0 431 557, whose chemical composition includes, by weight, from 0.1% to 0.3% of carbon, less than 0.25% of silicon, from 0.5% to 3.5% of manganese, less than 2% of nickel, from 1% to 3% of chromium, from 0.03% to 2% of molybdenum, from 0.01% to 1% of vanadium and less than 0.002% of boron, an element considered to be a harmful impurity, the remainder being substantially iron, the chemical composition having in addition to satisfy the relationship:

$$BH = 326 + 847.3 \times C + 18.3 \times Si - 8.6 \times Mn - 12.5 \times Cr \leq 460$$

On account of this formula, the maximum permissible carbon content is, in fact, 0.238%.

This steel has the advantage of having good resistance to fissuring during the refilling by welding, even in the absence of preheating or of postheating, but it has the disadvantage of being difficult to treat after repair by welding, especially because of the large difference in hardness between the ZAH of repair and the base metal (from 100 to 150 BH). In addition, this steel has a relatively low thermal conductivity, and this limits the output efficiency of manufacturing lines using molding.

In fact, the inventors have found that the usually employed concept of weldability only partially represents the repairability by welding of steels for molds. In fact, within the usual meaning of the concept of weldability, a weldable steel is a steel which does not fissure during welding operations, even in the absence of special precautions. In the case of the repair of steels for molds by welding, it is certainly necessary that there should be no fissures, but this is not enough. It is also necessary that the regions repaired by welding, as well as the zones affected by the heat which are adjacent thereto should machine, polish and grain well. Furthermore, it is often not essential for the operation of repair by welding to be capable of being carried out without preheating or postheating.

SUMMARY OF THE INVENTION

The aim of the present invention is to propose a steel which has at the same time the main characteristics desired for a steel intended for the manufacture of molds and which, while having a thermal conductivity which is better than that of known steels, is easily repairable by welding, that is to say, in particular, which retains good polishability and grainability after refilling by welding.

To this end the subject-matter of the invention is a steel for the manufacture of molds for injection molding of plastics, whose chemical composition contains, by weight:

$0.17\% \leq C \leq 0.27\%$
$0\% \leq Si \leq 0.5\%$
$0\% \leq Mn \leq 2\%$

-continued

0% ≤ Ni ≤ 2%
0% ≤ Cr ≤ 3%
0% ≤ Mo + W/2 ≤ 1.5%
0% ≤ V + Nb/2 + Ta/4 ≤ 0.5%
0.002% ≤ B ≤ 0.015%
0.005% ≤ Al ≤ 0.2%, optionally, at least one element taken from sulfur, selenium and tellurium, the sum of the contents of these elements being smaller than or equal to 0.2%, optionally, at least one element taken from titanium and zirconium, in contents such that the sum of the titanium content and of half the zirconium content is smaller than or equal to 0.3%, optionally, at least one element taken from lead and bismuth, the sum of the contents of these elements being smaller than or equal to 0.2%, optionally, calcium in a content lower than or equal to 0.1%, the remainder being iron and impurities resulting from the production, the chemical composition additionally satisfying the following relationships (contents in % by weight):

Cr + 3 × (Mo + W/2) + 10 × (V + Nb/2 + Ta/4) ≥ 2.1
Mo + W/2 > 0.7% if Cr ≤ 1.5%
Qu = 3.8 × C + 1.1 × Mn + 0.7 × Ni + 0.6 ×

Cr + 1.6 × (Mo + W/2) + 0.6 ≥ 3

R = 3.8 × C + 10 × Si + 3.3 × Mn + 2.4 ×

Ni + 1.4 × (Cr + Mo + W/2) ≤ 11.

The carbon content is preferably between 0.2% and 0.24%; similarly, it is preferable that the chromium content should be between 1.5% and 2.5%; it is also preferable that the molybdenum content should be between 0.5% and 1.2%.

The chemical composition may be chosen so that:

BH=326+847.3×C+18.3×Si−8.6×Mn−12.5×Cr>460 which has the advantage of making it possible to increase the thermal conductivity of the steel while improving the wear behavior of the cavities without detriment to repairability by welding.

Preferably, and in order to obtain very good thermal conductivity, the silicon content must be lower than or equal to 0.2% and, better still, lower than or equal to 0.1%.

When the steel contains titanium or zirconium—and this is desirable—it is preferable that the contents (in % by weight) of titanium, zirconium and nitrogen (an element which is always present at least as impurity) should be such that:

0.00003≤(N)×(Ti+Zr/2)≤0.0016.

In these conditions, if titanium or zirconium is introduced gradually by dissolving an oxidized phase, the number of titanium or zirconium nitride precipitates of size greater than 0.1 μm, counted over an area of 1 mm² of a micrographic section of the steel in the solid state, is smaller than 4 times the sum of the total content of titanium precipitated in the form of nitride and of half the total content of zirconium precipitated in the form of nitride, expressed in thousandths of % by weight. The very fine nitride precipitates have the advantage of refining the microstructure of the ZAH and of improving its toughness, and this favors good repairability by welding. The small number of coarse nitride precipitates is additionally favorable for machinability and polishability.

The steel according to the invention can be advantageously employed for the manufacture of molds for plastics made of cast steel. These molds are, in that case, manufactured by foundry techniques.

DESCRIPTION OF THE PREFERRED EMBODIMENT

The invention will now be described more precisely and illustrated by the examples which follow.

To satisfy the combination of the characteristics required for the manufacture of molds for injection molding of plastics, the steel must, in particular, make it possible to obtain a martensitic or bainitic structure in blocks whose thickness can reach 1500 mm and whose hardness must be greater than 250 BH after an annealing at a temperature higher than 500° C. For this, the steel must have sufficient quenchability and must therefore contain enough alloying elements. However, these alloying elements are detrimental to thermal conductivity. Also, their contents must be adjusted to obtain sufficient quenchability while maximizing thermal conductivity (or while minimizing thermal resistivity). Furthermore, the chemical composition of the steel has a marked effect on repairability by welding, and the composition must be chosen with this constraint being borne in mind.

The repairability by welding can be evaluated, in particular, by the difference in hardness between the ZAH (ZAH: zone affected by heating in the vicinity of the weld beads) and the base metal. The smaller this difference, the easier it is to carry out precision machining and good polishing. Whereas, in the case of the steels according to the prior art, the difference in hardness between the ZAH and the base metal is greater than 100 BH, the inventors have found that it is possible to adjust the chemical composition of the steel in such a way that this difference in hardness remains smaller than 50 BH while maintaining sufficient quenchability. Furthermore, to allow the graining to be done in good conditions, the microstructure of the ZAH must be as fine as possible. Finally, the welding must be capable of being carried out without the appearance of fissures. These considerations result in the investigation of a chemical composition such that, on the one hand, the ZAH has a bainitic structure and, on the other hand, that this bainitic structure has the lowest possible difference in hardness from the base metal.

In order to satisfy all these conditions simultaneously it is necessary, in particular, to limit the contents of elements which do not form carbides (for example manganese, nickel and silicon), to add quenching boron, and to increase the contents of carbide-forming elements such as vanadium, niobium and tantalum and, to a lesser extent, molybdenum and tungsten.

More precisely, the chemical composition of the steel must contain, by weight:

less than 0.27% of carbon but more than 0.17%, to obtain a sufficient wear resistance of the cavity; the carbon content must preferably be between 0.2% and 0.24%;

between 0.002% and 0.015% of boron accompanied by 0.005% to 0.2% of aluminum and, optionally, at least one element chosen from titanium and zirconium, the sum of the titanium content and half of the zirconium content being lower than 0.3%; the boron increases quenchability without increasing the difference in hardness between the ZAH and the base metal; beyond 0.015% it no longer has any significant effect on quenchability but, on the other hand, gives rise to some brittleness; the aluminum, titanium and zirconium are intended to deoxidize the steel and to bind the nitrogen, an element which is always present, at least as impurity, in order that it should not react with the boron;

molybdenum, completely or partially substituted by tungsten, in contents such that 0%≦Mo+W/2≦1.5% and preferably 0.5%≦Mo+W/2≦1.2%, accompanied by 0% to 3%, and preferably from 1.5% to 2.5% of chromium; the molybdenum and tungsten have a very favorable effect on quenchability, enhanced by an effect of synergism with boron, while having a low effect on thermal resistivity; moreover, these elements slow down the softening on annealing, and this is favorable to a small difference in hardness between the ZAH and the base metal and to obtaining a sufficient hardness after annealing above 500° C.; on the other hand, in excessive quantities, molybdenum and tungsten segregate strongly, and this is unfavorable for machinability and polishability; this is why the content is limited to 1.5% and preferably to 1.2%; the chromium is intended to supplement the effect of molybdenum on quenchability and on the softening on annealing.

Within this partial domain of composition, and as chromium, molybdenum and tungsten have partially complementary effects, it is preferable that, when the chromium content is lower than 1.5%, the sum of the molybdenum content and of half the tungsten content should be higher than 0.7%. This helps to maintain sufficient resistance to softening on annealing and to increase thermal conductivity without decreasing quenchability.

In order to introduce additional hardening on annealing without deteriorating the other characteristics, the steel may optionally contain at least one element taken from vanadium, niobium and tantalum in contents such that the sum of the vanadium content, of half the niobium content and of the tantalum content divided by 4 should be between 0% and 0.5% and, preferably, between 0% and 0.15%. These additions also contribute to reducing the difference in hardness between the ZAH and base metal.

In order that it should be possible to obtain a hardness greater than 250 EH after quenching and annealing at a temperature higher than 500° C., which is necessary to make it possible to perform sufficient stress-relieving, or to make it possible to carry out a surface treatment on the cavity, the chemical composition of the steel must satisfy the following condition:

$$Cr+3\times(Mo+W/2)+10\times(V+Nb/2+Ta/4)\geq 2.1$$

and, preferably, in order to make it possible to increase the annealing temperature and to reinforce the wear behavior:

$$Cr+3\times(Mo+W/2)+10\times(V+Nb/2+Ta/4)\geq 3.6.$$

Finally, the repairability by welding can be appreciably improved by imposing the presence of titanium or zirconium, introduced gradually into the liquid steel by dissolving an oxidized titanium or zirconium phase. When this is the case, the titanium or zirconium forms very fine nitride precipitates which refine the microstructure, and this has the advantage of improving the grainability and of increasing the toughness of the ZAH and, also, of the base metal. The increase in toughness has the advantage of reducing the risks of fissuring which are due to the welding.

To introduce the titanium or zirconium gradually it is possible, for example, to add the titanium or zirconium into the undeoxidized liquid steel and then to add a strong deoxidizer, such as aluminum, in a sufficient quantity to reduce the titanium or zirconium oxides which have formed. The titanium, zirconium and nitrogen contents, expressed in % by weight, must be such that:

$$0.00003\leq(Ti+Zr/2)\times(N)\leq 0.0016.$$

The nitrogen content, which depends on the conditions of production of the steel, lies between a few ppm and some hundreds of ppm.

By proceeding in this way, the formation of coarse titanium or zirconium nitrides which precipitate in the liquid steel is limited. The steel obtained then comprises a number of titanium or zirconium nitride precipitates of size greater than 0.1 $\mu$m, counted over an area of 1 mm$^2$ of a micrographic section of the steel in the solid state, which is smaller than 4 times the sum of the total content of titanium precipitated in the form of nitrides and of half the total content of zirconium precipitated in the form of nitrides, expressed in thousandths of % by weight. The steel thus obtained is therefore characterized not only by the presence of very fine nitrides but also by a small quantity of coarse nitrides, which is favorable for machinability and for polishability.

Besides the elements indicated above, the chemical composition also comprises the following elements:

silicon intended to deoxidize the steel, an element which has a very unfavorable effect especially on the thermal conductivity of the steel, and whose content must be as low as possible, in any event lower than 0.5% and, preferably, lower than 0.2% and, better still, lower than 0.1%;

manganese, which increases quenchability and binds the sulfur, but which has an unfavorable effect on thermal conductivity; its content is adjusted between 0% and 2% and must preferably remain higher than 0.2%, especially when the steel is resulfurized to improve its machinability, and not exceed 1.8%, to limit the localized segregations which are detrimental to machinability;

optionally, nickel between 0% and 2%, to increase quenchability; however, this element is both costly and not very favorable for good thermal conductivity, but is nevertheless often present as residues in steels manufactured from iron scrap; its content is preferably limited to 0.5%;

sulfur, always present in a small content as impurities, but which may be added to improve machinability, optionally accompanied by selenium or tellurium; it being necessary for the sum of the sulfur, selenium and tellurium contents to remain lower than 0.2%, especially in order not to deteriorate polishability;

optionally, at least one element taken from lead and bismuth, in contents such that the sum of these contents is smaller than or equal to 0.2%, and optionally calcium in a content lower than or equal to 0.1%; all these additions are intended to improve the machinability.

The remainder of the composition is iron and impurities resulting from the production. The impurities include especially copper, the content of which can reach 1% and which, in the presence of nickel, can have a favorable hardening effect.

Besides the composition limits which have just been described and to meet the objectives pursued by the invention, the chemical composition of the steel must satisfy two relationships, one relating to quenchability and the other to thermal resistivity (the reciprocal of conductivity).

To exhibit a sufficient quenchability, the chemical composition of the steel must satisfy the following relationship:

$$Qu=3.8\times C+1.1\times Mn+0.7\times Ni+0.6\times Cr+1.6\times(Mo+W/2)+0.6 \geq kQu$$

with kQu=3 and preferably kQu=4.

To exhibit good thermal conductivity the chemical composition of the steel must satisfy the following relationship;

$$R = 3.8 \times C + 10 \times Si + 3.3 \times Mn + 2.4 \times Ni + 1.4 \times (Cr + Mo + W/2) \leq kR$$

with kR=11 and preferably kR=9; (R is a number which varies in the same direction as thermal resistivity and therefore in opposite direction to thermal conductivity).

Inspection of the above two formulae shows that, in fact, the quenchability number Qu and the thermal resistivity number R vary overall in the same direction, but that by suitably choosing the chemical composition it would be possible, at equal quenchability, to maximize thermal conductivity. However, account must be taken of the other constraints, with the result that the inventors have found that the chemical composition can be adjusted in such a way that:

$$R \leq 1.5 + 1.83 \, Qu$$

and this is very preferable.

For the steel thus defined to have a good repairability by welding, it is not useful for its chemical composition to satisfy the relationship:

$$BH = 326 + 847.3 \times C + 18.3 \times Si - 8.6 \times Mn - 12.5 \times Cr \leq 460.$$

This is even not very desirable because this condition imposes at the same time a low carbon content which is not very favorable to good wear behavior of the cavity, and high contents of chromium and, above all, of manganese, which are unfavorable for thermal conductivity and for the similarity in hardness between the ZAH and the base metal. It is therefore preferable that the composition of the steel should be such that:

$$BH = 326 + 847.3 \times C + 18.3 \times Si - 8.6 \times Mn - 12.5 \times Cr > 460.$$

Before being employed for mold manufacture, the steel blocks, obtained by rolling or by forging, are subjected to a quenching heat treatment with air or water, depending on the thickness, and then subjected to an annealing at a temperature higher than 500° C. and preferably higher than 550° C. but lower than the $Ac_1$ point. This treatment is intended to give the steel a martensitic or bainitic structure (the structure may be mixed martensito-bainitic), substantially free from ferrite (it is desirable that there should be no ferrite at all; however, a small remainder of this constituent may still remain), and annealing at a temperature which is sufficient to ensure stress-relieving and to make it possible, if appropriate, to perform a surface treatment at a relatively high temperature. The annealing temperature is adjusted, in particular, for the hardness to be, at any point, between 250 BH and 370 BH and, preferably, between 270 and 350 BH.

The steel according to the invention presents a particular advantage for the manufacture of molds by foundry techniques, a technology which makes it possible to obtain a mold made of cast steel (and not of wrought steel as has been described above). According to this process, instead of machining the cavity of the mold in a parallelepipedal massive block in which channels are pierced for cooling by water circulation, a mold blank is manufactured by foundry techniques, comprising a blank of the mold cavity and outer parts which have an appropriate shape to ensure sufficient mechanical strength while resulting in walls that are much less thick than those obtained by the technique of machining the cavity from a massive block. The mold itself is obtained by a finishing machining of the blank and by a heat treatment. This machining has the advantage of being much less extensive than that which is necessary when starting from a massive block; on the other hand, cast steel comprises porosities which must be repaired by welding. The very good weldability of the steel according to the invention is then a very considerable advantage. Furthermore, the good thermal conductivity of the steel according to the invention is an additional advantage, since it makes it possible to reduce, or even to eliminate, cooling by water circulation in channels pierced in the walls of the mold, advantage being taken of the small thickness of the walls of the mold. It is possible, in fact, to produce molds whose cooling when in use is ensured by gas circulation around its outer parts. The heat treatment is identical with the heat treatment performed on the molds made of wrought steel; however, it must be preceded by one or more austenitizations intended to refine the grain.

By way of example, steels A, B, C, D and E in accordance with the invention were produced, which can be compared with the steels F, G, H, I, J and K in accordance with the prior art. The chemical compositions (in % by weight) of these steels are shown in Table 1. Annealed quenched blocks which have a bainitic or martensitic structure were manufactured with these steels by rolling or by forging; their thicknesses, conditions of heat treatment and the characteristics obtained are reported in Table 2 with, by way of comparison, the characteristics which are obtained with the steels F, G, H, I, J and K. In this table the thicknesses are expressed in mm, the quenchability numbers Qu are dimensionless coefficients, the thermal resistivity numbers R are dimensionless coefficients, the thermal conductivities are expressed in W/m/K, the hardnesses and the differences in hardness between the ZAH and the base metal, ΔH, are expressed in Brinell, and BH is a dimensionless coefficient.

TABLE 1

|   | C | Si | Mn | Ni | Cr | Mo | W | V | B | Ti |
|---|---|----|----|----|----|----|----|----|----|----|
| A | 0.215 | 0.045 | 0.420 | 0.210 | 2.320 | 0.790 | — | 0.047 | 0.003 | 23 |
| B | 0.215 | 0.045 | 1.030 | 0.220 | 2.290 | 0.815 | — | 0.002 | 0.003 | 52* |
| C | 0.225 | 0.057 | 0.460 | 0.250 | 2.450 | 0.880 | 0.200 | 0.003 | 0.003 | 27 |
| D | 0.210 | 0.051 | 0.390 | 0.195 | 1.910 | 0.540 | — | 0.045 | 0.003 | 23 |
| E | 0.230 | 0.120 | 0.480 | 0.220 | 2.050 | 0.520 | 0.610 | — | 0.003 | 24 |
| F | 0.395 | 0.300 | 1.490 | 0.210 | 1.920 | 0.270 | — | — | — | — |
| G | 0.410 | 0.310 | 1.410 | 0.980 | 1.950 | 0.280 | — | — | — | — |
| H | 0.200 | 0.050 | 1.820 | 0.180 | 2.280 | 0.320 | — | 0.020 | 0.001 | — |
| I | 0.270 | 0.210 | 0.875 | 0.850 | 1.400 | 0.400 | — | 0.016 | 0.003 | 25 |
| J | 0.200 | 0.055 | 1.520 | 0.980 | 2.010 | 0.710 | — | 0.018 | — | — |
| K | 0.265 | 0.325 | 0.850 | 0.835 | 1.420 | 0.410 | — | 0.035 | 0.003 | 23 |

*Zr and not Ti

Steels A, B, C, D and E additionally contain approximately 0.020% of aluminum, and the titanium has been introduced gradually.

TABLE 2

|   | thick | quench | anneal | Qu | R | conduc. | hard-ness | ΔH | BH |
|---|---|---|---|---|---|---|---|---|---|
| A | 140 | air | 590° C. | 4.6 | 7.5 | 49 | 329 | 18 | 476 |
| A | 400 | water | 590° C. | 4.6 | 7.5 | 49 | 331 | 16 | 476 |
| B | 1100 | water | 600° C. | 5.4 | 9.5 | 45 | 331 | 40 | 471 |
| C | 800 | water | 590° C. | 5.1 | 8.3 | 47 | 313 | 48 | 483 |
| D | 210 | water | 575° C. | 3.9 | 6.5 | 51 | 313 | 15 | 478 |
| E | 150 | air | 590° C. | 4.7 | 8.2 | 46 | 313 | 31 | 493 |
| F | 150 | air | 600° C. | 4.8 | 12.9 | 38 | 329 | 110 | 629 |
| G | 700 | water | 600° C. | 5.3 | 14.7 | 36 | 331 | 123 | 642 |
| H | 400 | water | 590° C. | 4.6 | 11.3 | 41 | 313 | 80 | 452 |
| I | 140 | air | 590° C. | 4.6 | 10.5 | 42 | 299 | 50 | 533 |
| J | 800 | water | 510° C. | 5.3 | 12.5 | 39 | 331 | 76 | 458 |
| K | 140 | air | 600° C. | 4.6 | 11.6 | 40 | 295 | 51 | 531 |

These results show that all the steels in accordance with the invention and given by way of example have both a thermal conductivity which is higher than or equal to 45 W/m/K and a difference in hardness between the ZAH and base metal ΔH lower than or equal to 45 Brinell, whereas the steels according to the prior art have both a thermal conductivity lower than or equal to 43 W/m/K and a difference in hardness between the ZAH and the base metal ΔH higher than or equal to 50 Brinell. In particular, because of the small difference in hardness between the ZAH and the base metal, steels A to E have a repairability by welding which is appreciably better than the steels F to K.

A comparison at equal quenchability and hence at maximum possible thickness, shows still more clearly the advantages of the steels according to the invention since, in the case of Qu=4.6, steels A and E (according to the invention), have a thermal conductivity higher than or equal to 40 W/m/K and a ΔH lower than or equal to 31 Brinell, whereas steels I, H and K (according to the prior art) have a thermal conductivity lower than or equal to 42 W/m/K and a ΔH higher than or equal to 50 Brinell; in the case of Qu>5, steels B and C (according to the invention) have a thermal conductivity higher than or equal to 45 W/m/K and a ΔH lower than or equal to 48 Brinell, whereas steels J and G (according to the prior art) have a thermal conductivity lower than or equal to 39 W/m/K and a ΔH higher than or equal to 76 Brinell. In both cases the gain in thermal conductivity is higher than 9% and the reduction in ΔH higher than 37%.

It should be noted that the repair by welding should preferably be carried out with an added metal of the same composition as the base metal. Accordingly, the steel according to the invention can be produced not only in block form, but also in the form of wire for welding or for the manufacture of welding electrodes.

This steel is more particularly intended for the molding of articles made of plastic or of rubber, and exclusively for materials whose temperature does not exceed 500° C.

We claim:

1. A steel for the manufacture of molds and especially of the molds for injection molding of plastics, having a chemical composition comprising, by weight:

$0.17\% \leq C \leq 0.27\%$ $0\% \leq Si \leq 0.5\%$

-continued $0\% \leq Mn \leq 2\%$ $0\% \leq Ni \leq 2\%$ $0\% \leq Cr \leq 3\%$ $0\% \leq Mo + W/2 \leq 1.5\%$, with the proviso that if $Cr \leq 1.5\%$, then $Mo + W/2 \geq 0.7\%$ $0\% \leq V + Nb/2 + Ta/4 \leq 0.5\%$ $0.002\% \leq B \leq 0.015$ $0.005\% \leq Al \leq 0.2\%$, optionally, at least one element taken from sulfur, selenium and tellurium, the sum of the contents of these elements being $\leq 0.2\%$.

optionally, at least one element taken from titanium and zirconium such that $Ti+Zr/2 \leq 0.3\%$, and wherein, with nitrogen present in the steel composition and Ti added to the steel, the amounts of Ti, Zr and N are such that:

$0.00003 \leq (N) \times (Ti+Zr/2) \leq 0.0016$ wherein, in the solid state, the number of titanium nitride or zirconium nitride precipitates of size greater than 0.1 μm, counted over an area of 1 mm² of a micrographic section of the steel in the solid state, is smaller than 4 times the sum of the total content of titanium precipitated in the form of the nitride and of half the total content of zirconium precipitated in the form of the nitride, expressed in thousandths of % by weight, optionally, at least one element taken from lead and bismuth, the sum of the contents of these elements being $\leq 0.2\%$, optionally, calcium in a content $\leq 0.1\%$, the remainder being iron and impurities resulting from the production, the chemical composition additionally satisfying the following relationships:

$Cr + 3 \times (Mo + W/2) + 10 \times (V + Nb/2 + Ta/4) \geq 2.1$ $Qu = 3.8 \times C + 1.1 \times Mn + 0.7 \times Ni + 0.6 \times Cr + 1.6 \times (Mo + W/2) + 0.6 \geq 3$ $R = 3.8 \times C + 10 \times Si + 3.3 \times Mn + 2.4 \times Ni + 1.4 \times (Cr + Mo + W/2) \leq 11$.

2. The steel as claimed in claim 1, wherein:

$0.2\% \leq C \leq 0.24\%$.

3. The steel as claimed in claim 1, wherein:

$1.5\% \leq Cr \leq 2.5\%$.

4. The steel as claimed in claim 3, wherein:

$0.5\% \leq Mo+W/2 \leq 1.2\%$.

5. The steel as claimed in claim 1, wherein said chemical composition satisfies the relationship:

$BH=326+847.3 \times C+18.3 \times Si-8.6 \times Mn-12.5 \times Cr > 460$.

6. The steel as claimed in claim 1, wherein said chemical composition satisfies the relationship:

$Cr+3 \times (Mo+W/2)+10 \times (V+Nb/2+Ta/4) \geq 3.6$.

7. The steel as claimed in claim 1, wherein:

Si≦0.2%.

8. The steel as claimed in claim 1, wherein:

Si≦0.1%.

9. A wire for welding or for the manufacture of welding electronics, which consists of a steel as claimed in claim 1.

10. The steel as claimed in claim 1, wherein said chemical composition comprises, by weight:

0.2%≦C≦0.24%

0%≦Si≦0.1%

0%≦Mn≦2%

0% Ni≦0.5%

1.5%≦Cr≦2.5%

0.5%≦Mo+W/2≦1.2%

%≦V+Nb/2+Ta/4≦0.15%

0.002%≦B≦0.015%

0.005%≦Al≦0.2%, the chemical composition satisfying the relationships:

Cr+3×(Mo+W/2)+10×(V+Nb/2+Ta/4)≧3.6

Qu>3

R≦1.5+1.83 Qu.

11. A method of manufacturing a mold for the injection molding of plastics, comprising:

forming the mold from a steel composition as claimed in claim 1.

12. The method of claim 11, wherein the mold is prepared by a foundry technique.

13. The steel as claimed in claim 1, wherein the steel has a thermal conductivity ≧45 W/m/K.

14. The steel as claimed in claim 1, wherein the difference in hardness between the zones affected by heat of welding (ZAH) and the base metal ΔH is ≦45 Brinell.

* * * * *